United States Patent [19]

Schotz

[11] Patent Number: 4,847,903
[45] Date of Patent: Jul. 11, 1989

[54] WIRELESS REMOTE SPEAKER SYSTEM

[75] Inventor: Larry Schotz, Cedarburg, Wis.

[73] Assignee: Recoton Corporation, Long Island City, N.Y.

[21] Appl. No.: 127,793

[22] Filed: Dec. 2, 1987

Related U.S. Application Data

[63] Continuation-in-part of Ser. No. 53,355, May 22, 1987.

[51] Int. Cl.$^4$ .............................................. H04H 5/00
[52] U.S. Cl. ....................................................... 381/3
[58] Field of Search ...................... 381/2, 3, 4, 14, 13, 381/106; 332/18; 455/223, 225; 390/310 A, 310 R, 310 CP

[56] References Cited

U.S. PATENT DOCUMENTS

| 2,932,794 | 4/1960 | Crow | 328/137 X |
| 3,369,078 | 2/1968 | Stradley | 340/310 CP |
| 3,400,221 | 9/1968 | Wolters | 381/77 |
| 4,194,087 | 3/1980 | Sakaida | 328/106 |
| 4,207,527 | 6/1980 | Abt | 381/14 |
| 4,398,060 | 8/1983 | Ienaka et al. | 455/194 |
| 4,442,546 | 4/1984 | Ishigaki | 381/106 |
| 4,457,019 | 6/1984 | Szabo, Jr. et al. | 455/63 |
| 4,491,957 | 1/1985 | Kamalski | 455/334 |
| 4,701,945 | 10/1987 | Pedigo | 379/64 |
| 4,704,726 | 11/1987 | Gibson | 381/13 |

Primary Examiner—Forester W. Isen
Attorney, Agent, or Firm—Curtis, Morris & Safford

[57] ABSTRACT

A device comprised of separate transmitter and receiver sections, which converts an audio signal into an FM signal, transmits the FM signal over AC power lines, and reconverts the FM signal into an audio signal, which can then be outputted to loudspeakers or other devices. By transmitting the signal over AC lines, no long wires are needed to connect remote loudspeakers or other devices to the source of the audio signal.

10 Claims, 2 Drawing Sheets

WIRELESS REMOTE SPEAKER SYSTEM

This is a continuation-in-part of copending application Serial No. 053,355, filed May 22, 1987.

BACKGROUND OF INVENTION

This invention relates to improvements in the communication of audio signals over AC power and wiring lines by which stereophonic signals may be transmitted from, for example, hi-fidelity audio equipment to loudspeakers.

Typical wireless intercom systems utilize AM transmission techniques for voice communication over AC wiring lines. AC wiring in most households are subjected to electromagnetic noise from many sources, particularly impulse noise or noise spikes from SCR or triac circuits of the type normally found in lamp dimmers. As a result, AM signals transmitted over such lines may be so degraded that the information contained therein is not comprehensible when received. It also has been found that in some environments, impulse noise and so-called dimmer interference may be picked up by the FM wireless speaker system disclosed in application Ser. No. 053,355.

OBJECTS OF THE INVENTION

It is one object of the present invention to provide an improved FM communication system for transmitting and/or receiving hi-fidelity audio signals, such as stereophonic signals over AC power lines, while avoiding degradation or loss of information in those signals.

A further object of this invention is to provide improvements in the wireless communication system disclosed in application Ser. No. 053,355, which minimize interference between the stereophonic channels therein and which exhibit greater noise immunity to impulse noise and the like generated by SCR, triac and lamp dimmer circuitry.

A further object of this invention is to mute the remote output devices in a wireless communication system when no audio signal is received over that system.

Another object of this invention is to provide a wireless stereophonic transmission system for use over AC power lines having selectable left-channel and right-channel transmission frequencies with improved immunity to cross-channel interference.

Further objects and advantages of the invention will be apparent from the ensuing detailed description of a preferred embodiment thereof, and the novel features will be particularly pointed out in the appended claims.

SUMMARY OF THE INVENTION

As described in application Ser. No. 053,355 a transmitter and receiver are provided; the transmitter accepting audio input signals, modulating the audio signals using FM principles and transmitting the FM signals over AC power wiring and the receiver receiving the FM signals, amplifying and filtering the FM signals, demodulating the FM signals into audio signals and outputting the audio signals.

In accordance with one aspect, the transmitter and receiver transmit and receive stereophonic signals. The transmitter accepts stereophonic audio inputs and modulates the audio signals on different carrier frequencies. The receiver receives the different carrier frequencies, rejects interference of one carrier with the other, demodulates them, and outputs stereophonic audio signals.

The transmitter is provided with an audio signal compressor and the receiver is provided with an audio signal expander. The compressor reduces the dynamic range of the transmitted audio signals and the expander increases the dynamic range of the received audio signals. Using these devices enables the transmitter and receiver to transmit and receive audio signals with very wide dynamic ranges, such as might be provided by a compact disc player, without requiring a large bandwidth signal.

In accordance with yet another aspect, the receiver has a muting circuit which automatically shunts the stereophonic outputs, as by a solid-state switch coupled to the demodulator outputs, if no audio signals are present.

As a feature of the improvement disclosed herein, the respective channels of the receiver (e.g. the left and right channels) are provided with band pass/band reject filters for passing the carrier frequency assigned to that channel and rejecting the carrier frequency assigned to the other channel. This enhances channel selectivity and minimizes interference of one channel with the other.

As another feature, each channel is provided with a noise cancellation circuit which removes impulse noise that might be superimposed onto the demodulated audio signals by, for example, SCR, triac or lamp dimmer, circuits which frequently are connected to household AC wiring.

BRIEF DESCRIPTION OF THE DRAWINGS

The following detailed description, given by way of example, and not intended to limit the present invention solely to the embodiments shown and described herein, will best be understood in conjunction with the accompanying drawings in which.

DETAILED DESCRIPTION OF PREFERRED EMBODIMENTS

To best understand the advantages attained by the present communication system, it is described herein in the environment of a remote stereophonic communication system capable of transmitting stereophonic audio signals (such as left-channel and right-channel signals) from a source to a destination. Examples of suitable sources include stereophonic receivers and amplifiers, which in turn may be connected to various audio sources, such as a magnetic tape player (for example, a reel-to-reel tape machine or a cassette deck), a compact disc player, a phonograph, or a tuner. Now that stereophonic television broadcasting has been introduced, a television receiver may serve as a suitable source. Examples of suitable destinations include stereophonic loudspeakers or headphones, or a magnetic tape recorder (such as a reel-to-reel or cassette deck). For convenience, it will be assumed that the present communication system is used to transmit audio signals over AC power lines to loudspeakers. However, it will be appreciated that this system may be used in other environments such as, but not limited to, the remote recording of a transmitted conversation, or the transmission of audio signals created during a studio recording session to remote headphones.

Broadly, the communication system includes a transmitting section and a receiving section separated from each other by any desirable distance, but interconnected by way of the usual AC power wiring normally provided in a household, office, or the like. The transmitting and receiving sections may be disposed in different rooms of a home.

TRANSMITTER SECTION

Figure 1:
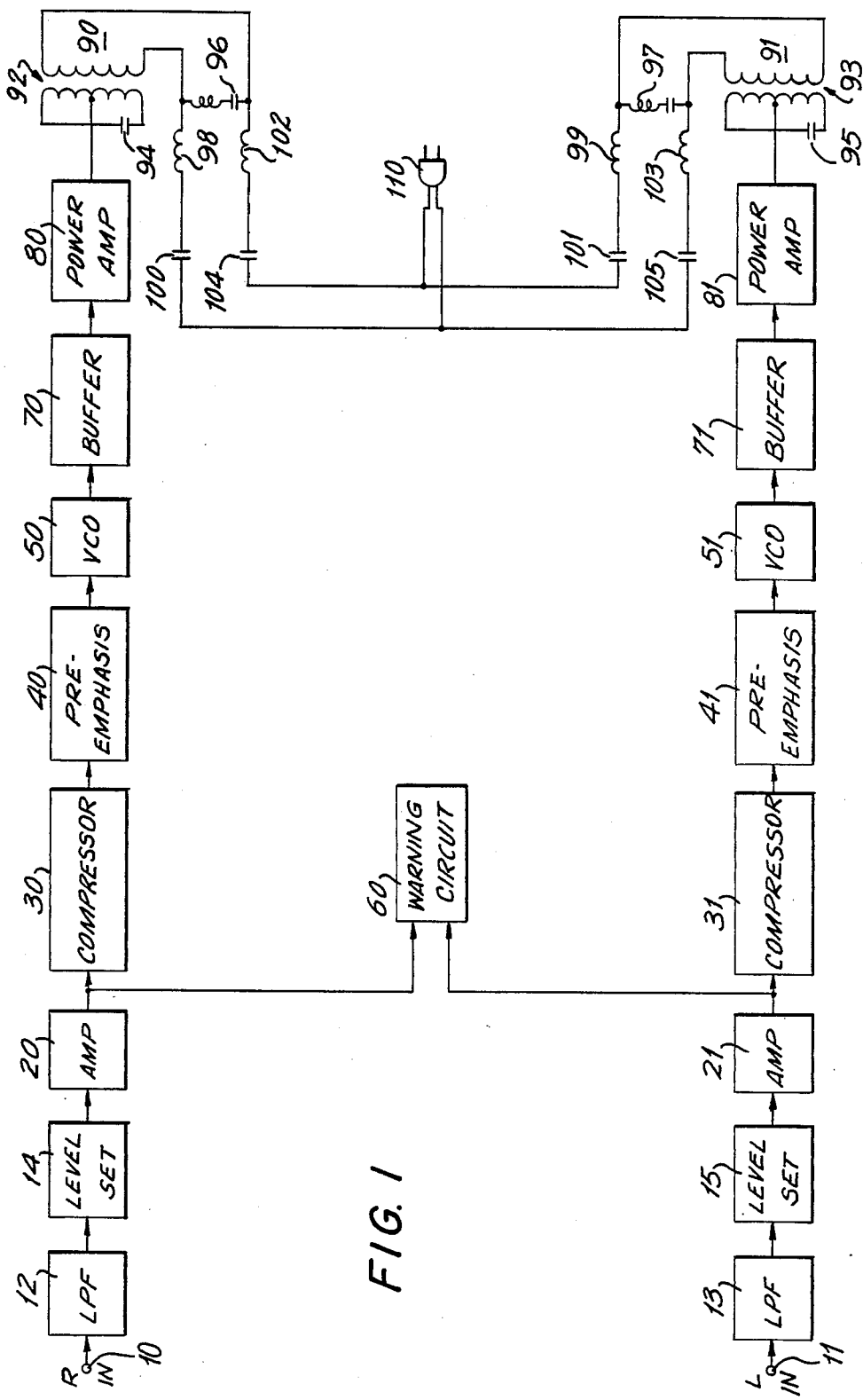
FIG. 1 is a block diagram of the transmitter section of the present invention.

As shown in FIG. 1, the transmitter section includes a pair of audio channels, such as right and left channels, comprised of input terminals 10 and 11, input buffer amplifiers 20 and 21, audio signal compressors 30 and 31, pre-emphasis networks 40 and 41, variable frequency oscillators 50 and 51, and tuned output networks 90 and 91, respectively. For convenience and simplification, elements designated by an even reference numeral are included in the right channel and elements designated by an odd reference numeral are included in the left channel.

Input terminals 10 and 11 couple the transmitter section to a source of stereophonic audio signals. Typically, the source may include such devices as a compact disc player, a cassette deck, a phonograph or a radio tuner. The terminals themselves can be designed to accept plug-in jacks, commonly called "banana" plugs, screw fasteners, or any other conventional mechanical/electrical connector.

Input buffer amplifiers 20 and 21 are coupled to input terminals 10 and 11 via low pass filters 12 and 13 and level setting circuits 14 and 15, respectively. The low pass filters serve to block higher frequency carrier signals which are modulated with the audio signals applied to terminals 10 and 11, to be described, from feeding back into the audio signal source. Level setting circuits 14 and 15 are adapted to establish an appropriate signal level (or attenuation) to accommodate audio signal sources having widely different signal level outputs; for example, both CD players and tape players may be accommodated. The buffer amplifiers are adapted to amplify the input signal (after being level-adjusted) without increasing the load on the audio source.

Audio signal compressors 30 and 31 are coupled to the output terminals of buffer amplifiers 20 and 21 and are adapted to reduce the dynamic range of audio signals supplied thereto by the buffers. Recently developed audio signal sources such as compact disc players have a very extended dynamic range, frequently as much as 90 to 100 dB. In an FM transmission system, such as used by the present invention, the audio signal is converted to FM by either increasing or decreasing the frequency of a carrier signal. To modulate a carrier frequency using a signal with the large dynamic range of a compact disc player would require very large deviations (i.e. modulations) in carrier frequency and consequently a very large bandwidth would be needed to accommodate such frequency shifts. Both large bandwidth and large deviations pose numerous problems, such as the need for a very linear frequency modulator (preferably, a voltage controlled oscillator) to modulate the signal. Although such oscillators are available, a simpler and more price-effective solution entails the use of a compressor to reduce the total dynamic range of the audio signal.

Compressors 30 and 31 each reduces the dynamic range of an audio signal to one-half its original range. In one embodiment, each compressor may be formed as, for example, a compressor/expander chip such as Signetics Model NE 570N. Other conventional signal compressors may be used.

Pre-emphasis networks 40 and 41 are coupled to the respective compressors 30 and 31. Each pre-emphasis circuit is adapted to increase the signal strength of higher frequency signals included in the compressed audio signals supplied by the compressor connected thereto. It is well-known that the distorting effects of noise in a transmission system increase with increasing signal frequency. Consequently, if the proportional strength of the high frequency components of the audio signal is to be maintained, the signal strength of the high frequency signal components should be increased relative to the other frequencies. Pre-emphasis networks 40 and 41, which are of conventional construction, perform this function. As the applied signal increases in frequency, its impedance decreases. Thus, more of the higher frequency signals pass through the pre-emphasis networks, and the desired proportional signal strength increase of the higher frequencies is obtained.

Variable frequency oscillators 50 and 51 are coupled to pre-emphasis networks 40 and 41 and are adapted to convert an audio signal supplied thereto into an FM signal. In the illustrated arrangement, a voltage controlled oscillator is used to convert the signal, but any conventional frequency modulator, or even a phase modulator, could be used in alternate embodiments.

The voltage controlled oscillators operate in a manner known to those of ordinary skill in the art to produce square wave outputs. The individual components 50 and 51 illustrated as "VCOs" may be formed as, for example, a voltage controlled oscillator chip such as National Semiconductor Model LM 566.

Tuned networks 90 and 91 are coupled to variable frequency oscillators 50 and 51 by buffers 70 and 71 and power amplifiers 80 and 81 which are adapted to increase the strength of the FM signal. The buffers provide the current drive requirements of the power amplifiers.

The tuned output networks are adapted to convert the square waves produced by the variable frequency oscillators 50 and 51 to sinusoidal waves. By the proper selection of the inductance of transformers 92 and 93 and the capacitance of capacitors 94 and 95, which comprise the tuned output networks, each network will resonate at a respective frequency. Consequently, each network will pass only a single sinusoidal wave having a designed resonant frequency.

The secondary windings of transformers 92 and 93 of tuned networks 90 and 91 are coupled to filter circuits which are adapted to pass a high frequency signal but to block low-frequency signals. By so doing, the filters, which apply the FM audio signals to the AC power lines, prevent the AC power signal, which is usually 60 Hz, from flowing into the transmitter. As shown, the right-channel filter is comprised of capacitors 100 and 104 connected in series with inductors 98 and 102 and the secondary winding of transformer 92. Additionally, an L-C circuit 96 tuned to the left-channel carrier frequency, is connected in parallel with the secondary of transformer 92. Capacitors 100 and 104 serve to couple the filter to the AC power lines via a conventional plug 110, which may be thought of as an output terminal of the transmitter section. The left-channel filter is of substantially the same construction, with an L-C circuit 97 tuned to the right-channel carrier frequency connected in parallel with the secondary of transformer 93. The secondaries of transformers 92 and 93 exhibit low output impedances and these match the AC power lines. L-C circuit 96 prevents the left-channel carrier from being fed back to transformer 92 and the filters formed of capacitor 100, inductor 98 and capacitor 104, inductor 102 present a high blocking impedance to the left-channel carrier frequency. A similar prevention of cross-channel interference is obtained by L-C circuit 97, capacitor 101, inductor 99 and capacitor 105, inductor 103. Although the filters have been constructed from inductors and capacitors, other methods of filter construction could be used with no alteration in function.

A power supply (not shown) is coupled to the AC power lines by plug 110 and is adapted to convert a 120V. AC signal to a supply voltage of 12V DC (or other desirable level) to power the previously described circuits. The power supply is of conventional construction and operation, known to those skilled in the art.

Although not shown in the present embodiment, a selector switch may be coupled to variable frequency oscillators 50 and 51 to permit the user to change operating (or carrier) frequencies. As an example, the switch may couple different resistors to the variable frequency circuits, thereby changing their basic carrier frequencies.

A level control warning circuit 60 is coupled to the output of buffer amplifiers 20 and 21 and is adapted to provide a visual warning (e.g. by means of an LED indicator lamp) that the signal level output from the buffer amplifiers is too high. The operator then may adjust level setting circuits 14, 15 to reduce this signal level. The warning circuit is comprised of comparators which compare the signals from buffer amplifiers 20 and 21 to reference voltage levels.

In operation, a stereophonic audio signal, comprising a right and a left channel, is applied to input terminals 10 and 11. As mentioned above, this signal may be derived from either a stereophonic amplifier or receiver, or any individual component of a stereophonic system such as a compact disc player, a tape deck, or a phonograph. As the operation of both right and left channels is virtually identical, with the exception of their different operating (or carrier) frequencies, only the operation of the right channel need be described.

Input terminal 10 supplies the right channel audio signal to low pass filter from which the filtered signal is applied to buffer amplifier 20 via level setting circuit 14. The buffer presents a high input impedance and a low output impedance to the signal, which allows the transmitter to operate without electrically loading the audio input device coupled to input terminal 10.

Warning circuit 60 detects if the buffer output signal is too high and would result in over modulation. If so, level setting circuit 14 may be adjusted by an operator to reduce the audio signal level. It is recognized that a high signal level applied to variable frequency oscillator 50 may cause the oscillator to over-modulate and produce a very distorted audio output. If the audio signal level is higher than the reference voltage established at the warning circuit, an "overmodulation" warning is produced. In the present embodiment the reference voltage is set at about 700 mV. Of course, this threshold level can be altered to accommodate any modifications to the variable frequency oscillators which would enable them to accept higher input voltages.

The amplified audio signal from buffer amplifier 20 is applied to signal compressor 30. As mentioned above, the audio signal, especially if it is produced by a compact disc player, may have a very wide dynamic range, perhaps as much as 90 to 100 dB. It is desirable to reduce the dynamic range of the audio signal; and compressor 30 reduces the dynamic range by about one-half.

After being reduced in dynamic range, the audio signal is pre-emphasized by pre-emphasis network 40 and then is applied to variable frequency oscillator 50, where it is frequency modulated. As the embodiment being described is designed to function in a stereophonic fashion, oscillators 50 and 51 are designed to operate at two different frequencies. In the present embodiment the chosen carrier frequencies are 485 kHz for the right channel and 345 kHz for the left. It has been found that at these frequencies, and particularly in the band of about 300-525 kHz, noise spikes generated by other circuits and devices connected to the AC power lines are minimized because they generally exhibit an "energy spectrum" below this band.

The FM signal from oscillator 50 is applied to buffer 70 and then by power amplifier 80 to tuned network 90. Network 90 is tuned to resonate at only the desired frequency for the channel, here 485 kHz. Thus only a sinusoidal signal with a frequency of 485 kHz is transferred to the secondary coil of transformer 92, and is applied by L-C circuits 98, 100 and 102, 104 to output terminal 110 and thence to the AC wiring. L-C circuit 96 resonates at the left-channel carrier frequency of 345 kHz to provide a low impedance thereto; whereas L-C circuits 98, 100 and 10, 104 provide a high impedance to this 345 kHz carrier.

RECEIVER SECTION

Figure 2:
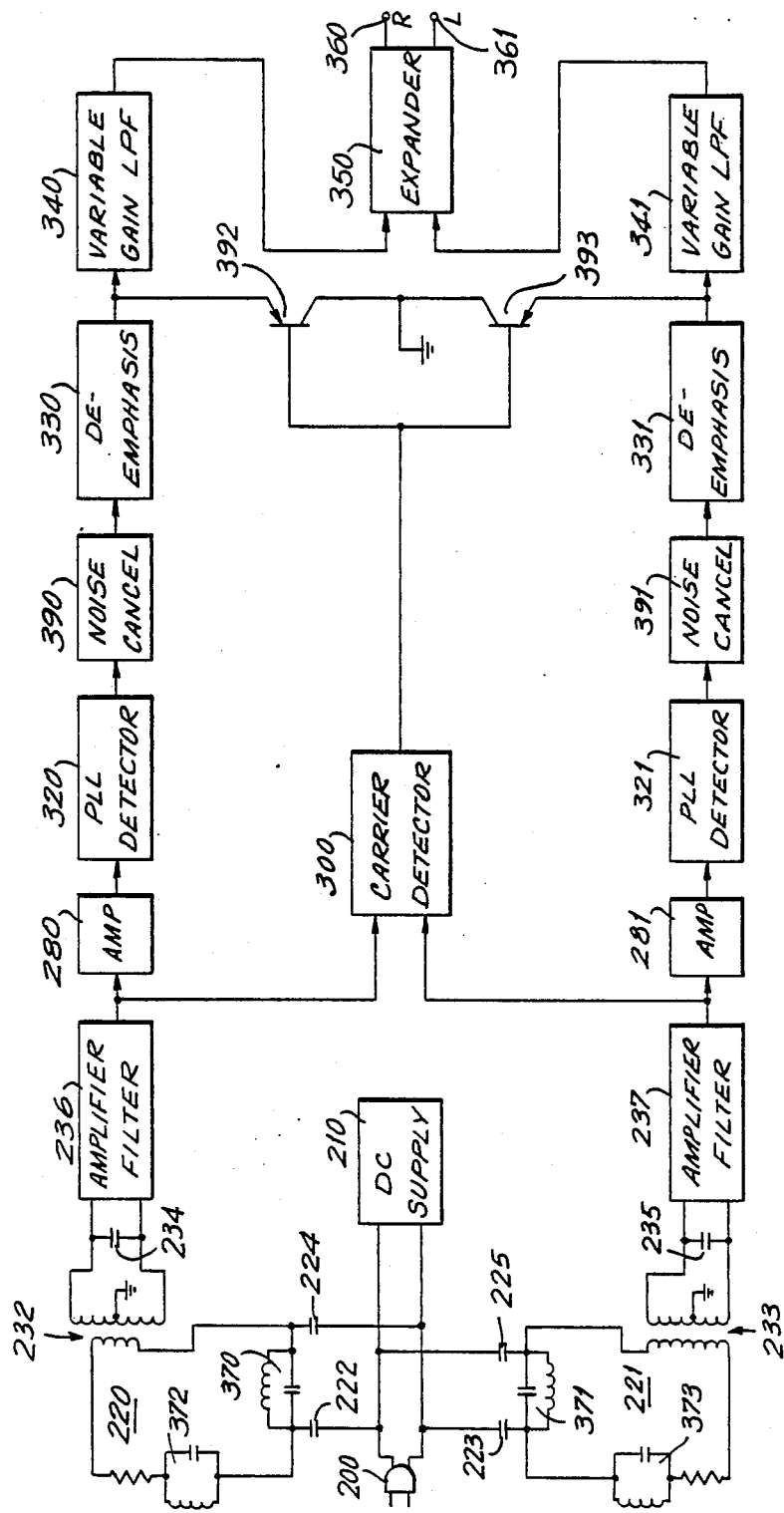
FIG. 2 a block diagram of the receiver section of the present invention.

As shown in FIG. 2, the receiving section is comprised of an input plug 200 coupled to left and right stereophonic demodulating channels formed of input filter circuits 220 and 221, amplifier-filter stages 236 and 237, FM detectors 320 and 321, de-emphasis circuits 330 and 331, audio signal expander 350, and output terminals 360 and 361. As in the transmitter, elements designated by an even reference numeral are included in the right demodulating channel and elements designated by an odd reference numeral are included in the left demodulating channel.

Input plug 200 couples the receiver to the AC wiring and is adapted to receive the transmitted FM signals. The input plug is also adapted to receive 120V. AC power and deliver it to a power supply 210 from which a DC supply voltage is derived to power the circuits included in the receiving section. The power supply is of conventional construction and operation, known to those skilled in the art, and may produce a 12V DC supply voltage or other suitable magnitude.

Input filter circuits 220 and 221 are coupled to input plug 200 and are each adapted to pass only their respective operating (carrier) frequency. Each filter is formed as a two-stage band-pass/band-reject filter. The first stage of filter 220, comprised of a parallel L-C circuit 370, is coupled to input plug 200 by capacitors 222 and 224 and is connected across the AC power lines. The second stage of filter 220 is comprised of a parallel L-C circuit 372 connected in series with the primary of a transformer 232 and coupled to the AC power lines by capacitors 222 and 224. Each L-C circuit is a band-pass filter, and L-C circuit 370 is tuned to the right channel carrier (485 kHz) effectively attenuating the left channel carrier (345 kHz). L-C circuit 372 is a notch filter tuned to block the left channel carrier.

Filter 221 is of similar construction with L-C circuit 371 tuned to the left channel carrier (345 kHz) and L-C circuit 373 tuned to block the right channel carrier. Thus, each filter passes one of the FM carriers and rejects the other. The filters also block AC power from the following receiver circuitry. Improved channel selection is obtained. Transformers 232 and 233 include center-tapped secondaries (whose center taps are connected to ground) and capacitors 234 and 235 respectively coupled across these secondaries, thus forming tuned resonant circuits adapted to filter out all signals except a sinusoidal signal with the desired resonant frequency. In this particular embodiment, the right channel carrier is passed through transformer 232 to amplifier filter 236 and the left channel carrier is passed through transformer 233 to amplifier filter 237.

FM detectors 320 and 321 are coupled to amplifier filters 236 and 237 via amplifiers 280 and 281, respectively and are adapted to demodulate the FM signal, thereby providing an audio signal which can be used by any device requiring an audio input, such as loudspeakers or a magnetic tape recording/playback device. Preferably, detectors 320 and 321 are phase locked loop detectors well known to one familiar with the art. In one embodiment, the individual components 320 and 321, illustrated as "PLL Detectors," may be formed as, for example, phase locked loop chips such as R.C.A. Model CD 4046BE, although other conventional phase locked loops may be used.

De-emphasis circuits 330 and 331 are coupled to phase locked loop detectors 320 and 321 by way of impulse noise cancellation circuits 390 and 391, respectively. Each de-emphasis circuit is adapted to decrease the signal strength of the higher frequency components of the audio signal provided by the phase locked loops so as to counteract the pre-transmission boost of the high frequency components by pre-emphasis networks 40 and 41 (FIG. 1).

Each of noise cancellation circuits 390 and 391 preferably is formed as an integrated circuit chip to cancel pulse noise that may be superimposed on the FM carriers because of SCR, triac or lamp dimmer circuitry connected to the AC power line. One example of a preferred noise cancellation circuit is Model LA2110, manufactured by the Semiconductor Division of Tokyo Sanyo Electric Co., Ltd. Since this circuit is conventional and is commercially available, no further description thereof is provided herein.

Variable low-pass filter circuits 340 and 341 are coupled to de-emphasis circuits 330 and 331 and are adapted to filter out any residual operating (carrier) frequency signals from the audio signal. These residual operating (carrier) frequency signals could cause audio signal expander 350 to operate when no audio signal is present. Furthermore, since the output level produced by each phase locked loop detector 320 and 321 may differ, due to variation in manufacturing, filter circuits 340 and 341 are adapted to compensate for such difference to provide the correct audio signal level to signal expander 350.

Audio signal expander 350 is coupled to filter circuits 340 and 341 and is adapted to restore the original dynamic range of the audio signal. The compressor 30, 31 (see FIG. 1) in the transmitter section reduces the dynamic range of the audio signal by about one-half, and expander 350 serves to double the dynamic range. In one embodiment, expander 350 may be formed as, for example, a compressor/expander chip such as Signetics Model NE 570N, although other conventional signal expanders may be used.

Output terminals 360 and 361 are coupled to the audio signal expander and serve to connect the illustrated receiving section to a variety of output devices, such as stereophonic loudspeakers, stereophonic headphones, recording devices and the like. The terminals themselves are adapted to accept plug-in jacks, commonly called "banana" plugs, screw fasteners, or any conventional mechanical/electrical connection. In one embodiment a selector switch (not shown) enables a user to choose between output devices, in a manner obvious to one skilled in the art.

A muting circuit including a carrier detector 300 is coupled to amplifier filters 236 and 237 and is adapted to turn on transistors 392 and 393 coupled to the outputs of FM detectors 320 and 321 to shunt the outputs of the left and right demodulating channels in the absence of a carrier in either channel. Hence, in the absence of an audio signal (i.e. a modulated carrier) in one or the other channel, undesirable hum and hiss in any output device is greatly reduced.

In the present embodiment both the left channel and right channel operate in a virtually identical fashion. Consequently only the operation of the right channel needs to be described.

Input plug 200 of the receiving section is inserted into an AC power outlet. This serves the dual purpose of energizing the illustrated circuits through power supply 210 and coupling any FM signals which might be received to the receiver section. When an FM signal is received, input filter circuit 220 removes the 60 Hz AC power signal, passes the right-channel FM signal and rejects the left-channel FM signal. Other low frequency noise also is removed by this filter from the received information signal.

The output from filter circuit 220 is amplified and further filtered by amplifier filter 236. The signal then is sampled by carrier detector 300. If a carrier signal is not present at the output of the amplifier filter, transistor 392 is turned on and the output de-emphasis circuit 330 is shunted to ground. Thus, in the absence of a carrier signal, no "hiss" or "hum" appears in the output devices. It is appreciated that transistor 392 may be coupled to the output of FM detector 320, noise cancellation circuit 390, de-emphasis circuit 330, variable gain filter 340 or expander 350. Furthermore, the base electrodes of transistors 392 and 393 are connected in common so that both transistors are turned on if a carrier is not sensed in either demodulating channel.

Assuming an FM signal has been received, it is applied to amplifier stage 280 whereat it is amplified and then applied to phase locked loop detector 320 which demodulates the FM signal and provides an audio signal output.

Impulse noise is cancelled from the audio signal by noise cancellation circuit 390, and the demodulated audio signal then is de-emphasized by de-emphasis circuit 330, filtered by low-pass filter 340, and then expanded to its original dynamic range by audio signal expander 350. Preferably, filter 340 is adjusted during assembly of the receiver section to insure that the signal level at the output of the filter is at the proper level for audio signal expander 350 to function correctly.

In audio signal expander 350, for every 1 dB range in the signal supplied thereto, a 2 dB range in the output signal is produced. The expanded, recovered audio signal then is applied to output terminal 360.

In a similar operation, the other channel of frequency-modulated audio information is amplified, filtered, demodulated, noise-cancelled and expanded to recover the original audio signal. This audio signal is supplied to output terminal 361.

While the foregoing has been particularly shown and described with reference to a preferred embodiment, it will be readily appreciated by those of ordinary skill in the art that various changes and modification may be made. For example, if several transmitter units are operating on the same AC wiring system, a frequency change switch may be coupled to oscillators 50 and 51 to change the two carrier frequencies generated by these oscillators such that each transmitter operates with a distinctive set of carrier frequencies and allows non-interfering operation of the multiple transmitters. A similar adjustment may be made to FM detectors 320 and 321 to recover distinctive carrier frequencies. Also, an output selector switch might be coupled to output terminals 360 and 361 to enable the user to connect several output devices to his receiver section and then choose among them.

It is intended that the appended claims be interpreted as including the foregoing as well as other changes and modifications.

What is claimed is:

1. A device for receiving stereophonic FM signals, including at least two different carrier frequencies modulated with stereophonic audio information, from AC power lines and for converting the frequency modulated carrier frequency signals to stereophonic audio signals comprising
   input means coupled to said AC power lines for receiving FM signals;
   first and second stereophonic demodulating channels, each channel including:
   band-pass notch filter means coupled to said input means for passing one of said carrier frequencies, rejecting the other carrier frequency and filtering out noise on said AC power lines;
   amplifier means coupled to said band-pass/notch filter means for amplifying the passed frequency modulated carrier signal; and
   demodulating means coupled to said amplifier means for demodulating the passed frequency modulated carrier signal to produce a respective one of said stereophonic audio signals therefrom; and
   output means coupled to the demodulating means of both channels for outputting said stereophonic audio signals.

2. The device of claim 1 further comprising muting means coupled to both demodulating channels for monitoring the presence of received FM signals in either channel and for inhibiting the stereophonic audio signals of both channels from being supplied to said output means when FM signals are not detected in at least one channel.

3. The device of claim 1 wherein said output means comprises first and second outputs for outputting said stereophonic audio signals, respectively.

4. The device of claim 1 wherein the received stereophonic FM signals exhibit compressed dynamic range, and further comprising audio signal expander means coupled to the demodulating means in each channel for expanding the dynamic range of said stereophonic audio signals before applying said stereophonic audio signals to said output means.

5. The device of claim 1 wherein said demodulating means comprises phase locked loop means.

6. The device of claim 5 further comprising adjustable filter means in each channel for coupling said phase locked loop means to said output means.

7. The device of claim 2 wherein said muting means comprises first and second transistor means respectively coupled to each channel for shunting the stereophonic audio signals produced by the demodulating means in that channel; and carrier detecting means coupled to both demodulating channels for operating said first and second transistor means if a carrier signal is not detected in one or the other demodulating channel.

8. The device of claim 1 wherein said band-pass/notch filter means comprises a first band-pass filter having a resonant frequency tuned to said one carrier frequency and connected across said AC power lines; and a second band-pass filter exhibiting maximum impedance at said other carrier frequency and connected in series with said amplifier means, whereby said first band-pass filter passes the one frequency modulated carrier signal to said amplifier means and said second band-pass filter substantially blocks the other frequency modulated carrier signal.

9. An FM communications system comprising a device for transmitting stereophonic audio signals over an AC power line comprising input means for providing stereophonic audio signals; first and second signal processing channels, each comprising; input buffer means coupled to said input means for amplifying a respective one of said stereophonic audio signals; modulation means responsive to said input buffer means for frequency modulating a respective carrier with a respective one of said stereophonic audio signals to produce an FM carrier signal; and filter means coupled to said modulation means and tuned to the frequency of said respective carrier frequency for removing unwanted frequency components in said FM carrier signal and for coupling said FM carrier signal to said AC power line; an AC power line coupled to said filter means of both channels for carrying said FM carrier signals; and a device coupled to said AC power line for receiving FM carrier signals from AC power lines and for converting FM carrier signals to stereophonic audio signals comprising input means coupled to said AC power lines for receiving FM carrier signals; first and second band-pass/notch filter means coupled to said input means for passing respective ones of the FM carrier signals and for rejecting the other of the respective FM carrier signals and for filtering out undesired noise on the AC power line; first and second amplifier means coupled to said first and second filter means, respectively, for amplifying the respectively passed FM carrier signals; first and second demodulating means coupled to said first and second amplifier means, respectively, for demodulating the passed FM carrier signals to produce first and second stereophonic audio signals; first and second impulse noise cancellation means coupled to the first and second demodulating means, respectively, to remove impulse noise that may be present in the demodulated stereophonic audio signals; and output means coupled to said first and second impulse noise cancellation means for outputting said stereophonic audio signals.

10. The system of claim 9 further comprising audio signal compressor means coupled to said input buffer means for compressing the dynamic range of said stereophonic audio signals before applying said stereophonic audio signals to said modulation means; and said output means includes audio signal expander means for expanding the dynamic range of said stereophonic audio signals.

* * * * *